United States Patent
Hubbert et al.

(10) Patent No.: US 10,072,509 B2
(45) Date of Patent: Sep. 11, 2018

(54) GAS TURBINE ENGINE NOSE CONE ATTACHMENT

(71) Applicant: UNITED TECHNOLOGIES CORPORATION, Hartford, CT (US)

(72) Inventors: Corey L. Hubbert, Manchester, CT (US); Peter V. Tomeo, Middletown, CT (US); Carney R. Anderson, East Haddam, CT (US)

(73) Assignee: United Technologies Corporation, Farmington, CT (US)

( * ) Notice: Subject to any disclaimer, the term of this patent is extended or adjusted under 35 U.S.C. 154(b) by 339 days.

(21) Appl. No.: 14/768,228

(22) PCT Filed: Feb. 26, 2014

(86) PCT No.: PCT/US2014/018567
§ 371 (c)(1),
(2) Date: Aug. 17, 2015

(87) PCT Pub. No.: WO2014/137688
PCT Pub. Date: Sep. 12, 2014

(65) Prior Publication Data
US 2015/0361804 A1 Dec. 17, 2015

Related U.S. Application Data

(60) Provisional application No. 61/773,687, filed on Mar. 6, 2013.

(51) Int. Cl.
*F01D 5/32* (2006.01)
*F01D 5/06* (2006.01)
(Continued)

(52) U.S. Cl.
CPC .............. *F01D 5/32* (2013.01); *F01D 5/02* (2013.01); *F01D 5/066* (2013.01); *F01D 5/12* (2013.01);
(Continued)

(58) Field of Classification Search
CPC ..... F01D 5/32; F01D 5/02; F01D 5/12; F01D 5/3007; F01D 9/04; F05D 2220/32; F05D 2230/60
See application file for complete search history.

(56) References Cited

U.S. PATENT DOCUMENTS 6,457,942 B1  10/2002 Forrester
6,481,971 B1  11/2002 Forrester
(Continued)

FOREIGN PATENT DOCUMENTS

EP  1357254  10/2003

OTHER PUBLICATIONS

International Search Report for PCT Application No. PCT/US2014/018567, dated May 28, 2014.
(Continued)

*Primary Examiner* — Mark Laurenzi
*Assistant Examiner* — Shafiq Mian
(74) *Attorney, Agent, or Firm* — Carlson, Gaskey & Olds, P.C.

(57) ABSTRACT

A fan section for a gas turbine engine includes a fan hub having blade slots for receiving a root of a fan blade. A lock ring is configured to move rotatably from an unlocked position to a locked position for securing the blade root in the blade slot. A nose cone is secured to the lock ring, and thereby secured to the fan section.

7 Claims, 8 Drawing Sheets

(51) Int. Cl.
  *F01D 5/02* (2006.01)
  *F01D 5/12* (2006.01)
  *F01D 5/30* (2006.01)
  *F01D 9/04* (2006.01)
  *F02K 3/06* (2006.01)

(52) U.S. Cl.
  CPC ............ *F01D 5/30* (2013.01); *F01D 5/3007* (2013.01); *F01D 9/04* (2013.01); *F02K 3/06* (2013.01); *F05D 2220/32* (2013.01); *F05D 2230/60* (2013.01); *Y02T 50/673* (2013.01); *Y10T 29/49323* (2015.01)

(56) References Cited

U.S. PATENT DOCUMENTS

| | | | | |
|---|---|---|---|---|
| 6,739,837 | B2* | 5/2004 | Barnette | F01D 5/3007 416/219 R |
| 6,846,159 | B2* | 1/2005 | Zabawa | F01D 21/04 416/193 A |
| 6,887,043 | B2 | 5/2005 | Dix et al. | |
| 7,686,585 | B2 | 3/2010 | Buisson et al. | |
| 8,162,616 | B2 | 4/2012 | Belmonte et al. | |
| 9,017,032 | B2* | 4/2015 | Mason | F01D 11/008 416/193 A |
| 9,017,033 | B2* | 4/2015 | Brown | F01D 5/147 416/193 A |
| 9,376,926 | B2* | 6/2016 | Anderson | F01D 5/3015 |
| 9,650,902 | B2* | 5/2017 | Billings | F01D 5/3007 |
| 2003/0194318 | A1* | 10/2003 | Duesler | F01D 5/323 416/2 |
| 2004/0184919 | A1 | 9/2004 | Zabawa | |
| 2007/0020089 | A1 | 1/2007 | Forgue et al. | |
| 2009/0214354 | A1 | 8/2009 | Bagnall | |
| 2010/0158676 | A1 | 6/2010 | Bottome | |
| 2010/0226786 | A1* | 9/2010 | Mahan | F01D 5/026 416/245 R |
| 2011/0032987 | A1 | 2/2011 | Lee et al. | |
| 2011/0052398 | A1 | 3/2011 | Fulayter et al. | |
| 2011/0186925 | A1 | 6/2011 | Anderson et al. | |
| 2013/0011253 | A1 | 1/2013 | Mulcaire | |
| 2013/0309073 | A1* | 11/2013 | Brown | F01D 5/3007 415/173.1 |

OTHER PUBLICATIONS

International Preliminary Report on Patentability for International Application No. PCT/US2014/018567 dated Sep. 17, 2015.
Extended European Search Report for European Application No. 14760886.3 dated Sep. 20, 2016.

* cited by examiner

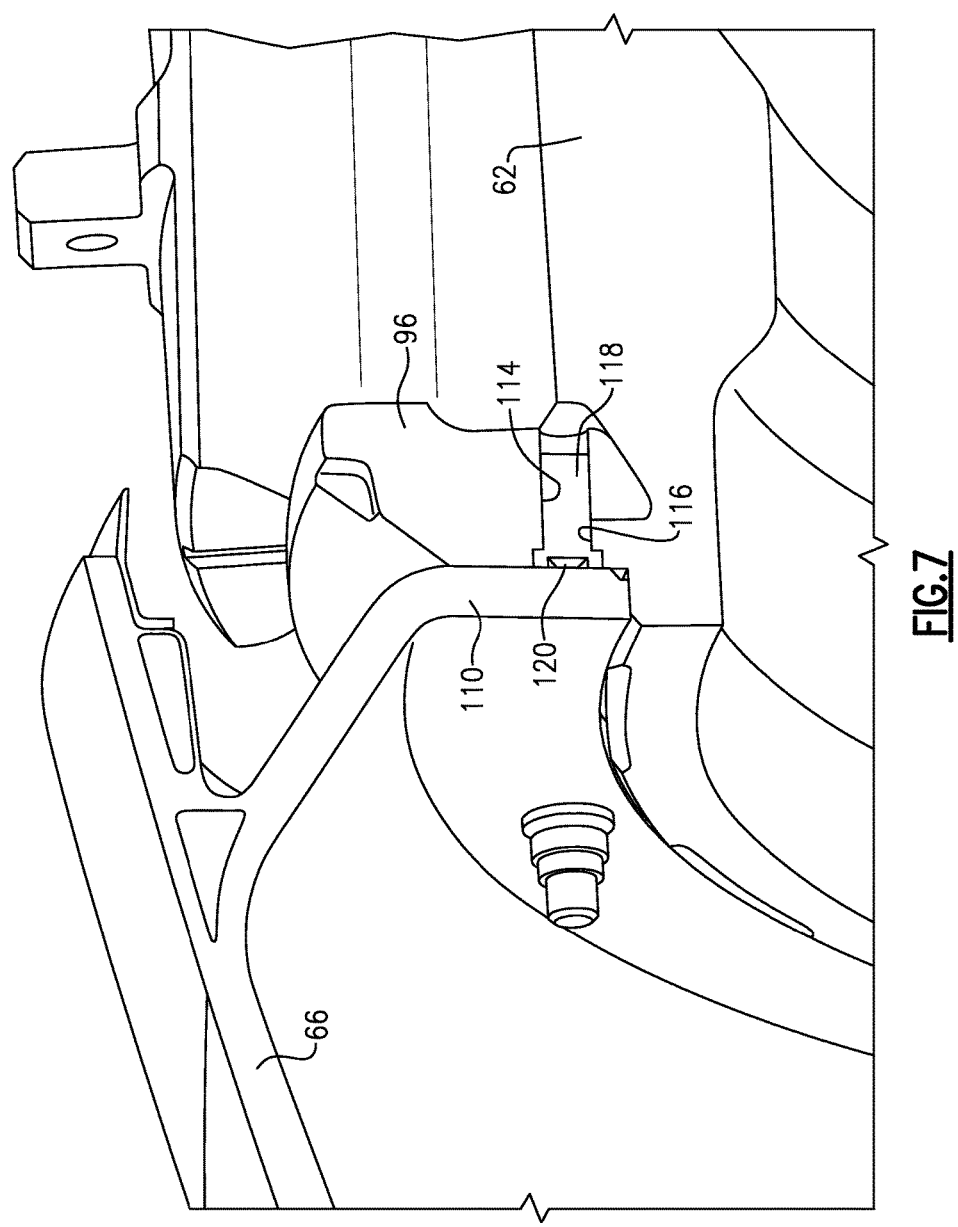

GAS TURBINE ENGINE NOSE CONE ATTACHMENT

BACKGROUND

This disclosure relates to a nose cone of a gas turbine engine fan section and, in particular, attaching the nose cone relative to a fan hub.

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

One type of gas turbine engine includes a fan drive gear system having a fan section with relatively large fan blades. The fan blades are mounted to a fan hub, and a blade lock assembly is used to axially retain the fan blades within corresponding fan hub slots. One example blade lock assembly includes a lock ring that is axially slid onto the fan hub in an unlocked position and rotated to a locked position. In the locked position, fan hub and lock ring tabs are aligned with one another to prevent axial movement of the lock ring with respect to the fan blades. A retaining ring, or pilot ring, having circumferentially spaced prongs is mounted to the fan hub with the prongs received in spaces between the lock ring and fan hub. The retaining ring is bolted to the fan hub. A nose cone is located by the retaining ring.

SUMMARY

In one exemplary embodiment, a fan section for a gas turbine engine, includes a fan hub having blade slots for receiving a root of a fan blade. A lock ring is configured to move rotatably from an unlocked position to a locked position for securing the blade root in the blade slot. A nose cone is secured to the lock ring, and thereby secured to the fan section.

In a further embodiment of any of the above, the fan hub includes circumferentially spaced first slots. The lock ring includes circumferentially spaced second slots aligned with the first slots in the locked position. The fan section comprises a plurality of discrete locating elements, each configured to be slidably received in paired first and second slots in the locked position to prevent rotational movement of the lock ring relative the fan hub.

In a further embodiment of any of the above, the first and second slots are arcuate in shape, and each locating element includes a pin engaging the first and second slots in an interference fit.

In a further embodiment of any of the above, the pin includes an end retained by the spinner.

In a further embodiment of any of the above, the first and second fastening elements cooperate with one another to secure the spinner directly to the lock ring.

In a further embodiment of any of the above, the second fastening element is a nut secured to the first fastening element.

In a further embodiment of any of the above, the first fastening element is carried by the lock ring.

In a further embodiment of any of the above, the first fastening element includes a head cooperating with a corresponding locating feature in the lock ring to prevent rotation of the first fastening element.

In a further embodiment of any of the above, the corresponding locating feature is a notch in a back side of the lock ring.

In a further embodiment of any of the above, the fan hub provides a shoulder. The spinner includes a flange having an inner diameter radially located with respect to the shoulder to concentrically align the nose cone with the fan hub.

In a further embodiment of any of the above, the nose cone includes a spinner that provides the flange. A cap is secured to the spinner to enclose a cavity of the spinner.

In one exemplary embodiment, a method of assembling a fan section of a gas turbine engine includes the steps of mounting fan blades into a fan hub, sliding a lock ring onto the fan hub, rotating the lock ring to axially retain the fan blades within the fan hub, and securing a nose cone directly to the lock ring.

In a further embodiment of any of the above, the mounting step includes sliding roots of the fan blades into the corresponding slots in the fan hub, whereby the lock ring axially blocks the axial movement of the fan blade roots.

In a further embodiment of any of the above, the method includes the step of inserting the first fastening elements into the lock ring prior to sliding the lock ring onto fan hub.

In a further embodiment of any of the above, the method includes the step of inserting discrete locating elements into aligned slots in the fan hub and lock ring to prevent relative rotational movement between the lock ring and fan hub prior to the securing step.

In a further embodiment of any of the above, the nose cone retains the locating elements axially.

In a further embodiment of any of the above, the securing step includes fastening a spinner to the lock ring, and securing a cap to the spinner.

BRIEF DESCRIPTION OF THE DRAWINGS

The disclosure can be further understood by reference to the following detailed description when considered in connection with the accompanying drawings wherein:

FIG. 7 is a cross-sectional perspective view through the lock pins.

DETAILED DESCRIPTION

Figure 1:
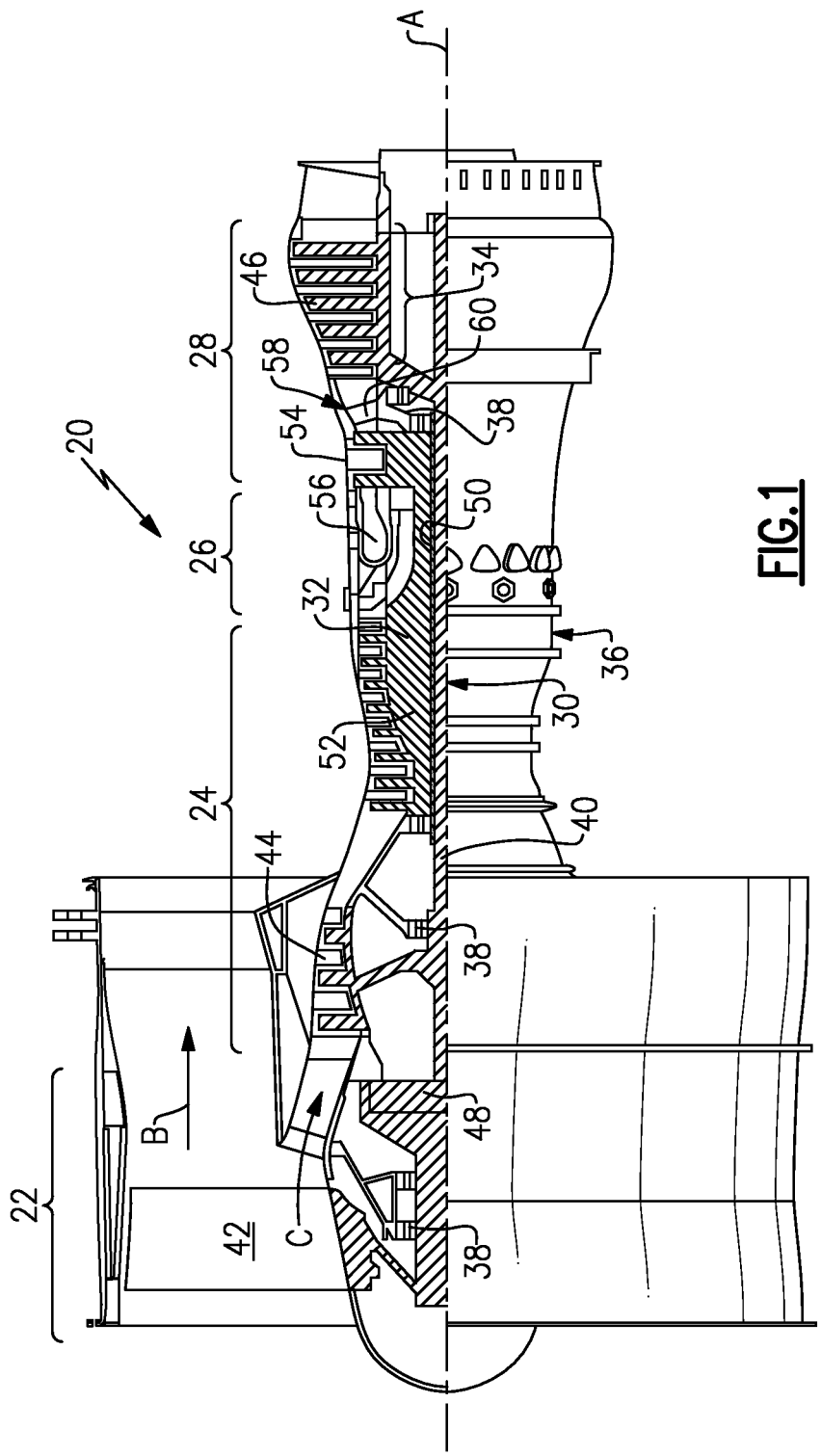
FIG. 1 schematically illustrates a gas turbine engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan having fan blades 42 and a low pressure (or first) compressor section 44 to a low pressure (or first) turbine section 46. The inner shaft 40 drives the fan blades 42 through a speed change device, such as a geared architecture 48, to drive the fan blades 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram° R)/(518.7° R)]^{0.5}$. The "Low corrected fan tip speed", as disclosed herein according to one non-limiting embodiment, is less than about 1150 ft/second.

Figure 2A:
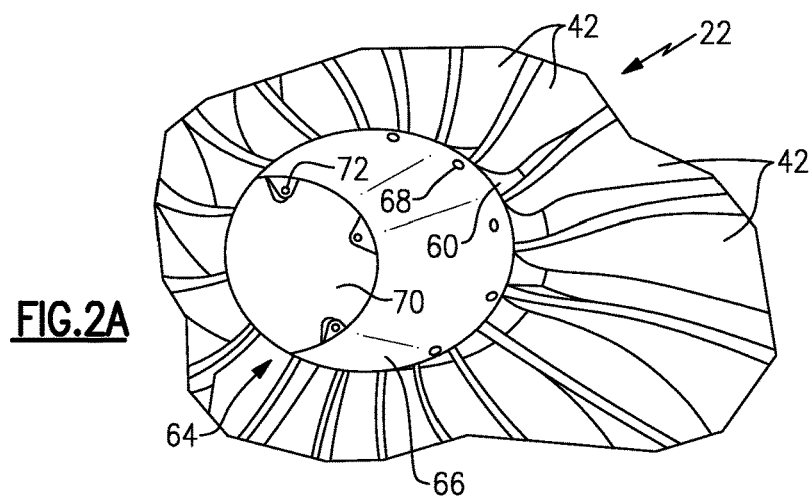
FIG. 2A is a perspective view of a portion of a fan section having fan blades and discrete platforms.
Figure 2B:
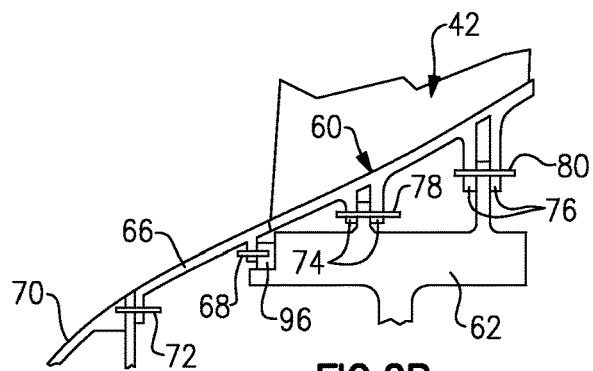
FIG. 2B is a schematic cross-sectional view through a portion of the fan section shown in FIG. 2A.
Figure 2C:
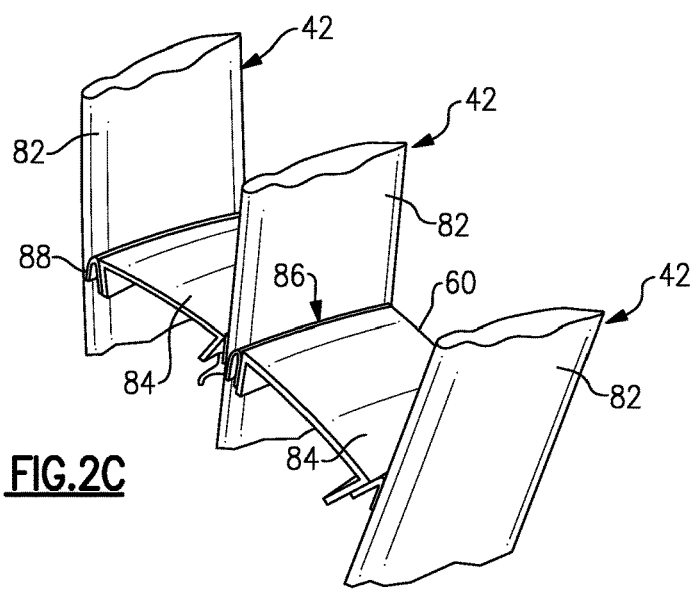
FIG. 2C is a schematic perspective view of the fan section with a nose cone removed.

The fan section 22 is shown in more detail in FIGS. 2A-2C. The fan section 22 includes multiple circumferentially arranged fan blades 42. Platforms 60, or spacers, are arranged between adjacent fan blades 42 and may be integral with or discrete from the fan blades 42. Referring to FIGS. 2A and 2B, the fan blades 42 are mounted to a fan hub 62. A nose cone 64 is arranged forward of the fan blades 42 to provide an aerodynamic inner flowpath through the fan section 22 along with the platforms 60. The nose cone 64 is provided by a spinner 66 and a cap 70. The nose cone 66 is secured to the fan hub 62, via a lock ring 96 (FIG. 2B), by fasteners 68. The cap 70 is secured to the spinner 66 by fasteners 72. A one-piece nose cone may also be used in which the cap 70 is integrated with the spinner 66.

Referring to FIG. 2B, the platform 60 includes first and second flanges 74, 76 secured to corresponding attachment features on the fan hub 62 respectively by fasteners 78, 80. The fasteners 68, 72, 78, 80 are schematically depicted in FIGS. 2A and 2B by simple, thickened lines for clarity. The arrangement shown in FIG. 2B is exemplary, and other platform configurations may be used, if desired.

Referring to FIG. 2C, each fan blade 42 has an airfoil 82. Each platform 60 has an outer surface 84, which together form a ring with the other platforms 60, spaced about axis A to provide an aerodynamic inner flow path surface. Though close fitting, a circumferential gap 86 exists between each platform outer surface 84 and an adjacent fan blade 42. Each gap 86 is blocked with a seal 88 to minimize a loss of airflow through the gas turbine engine 10.

Figure 3:
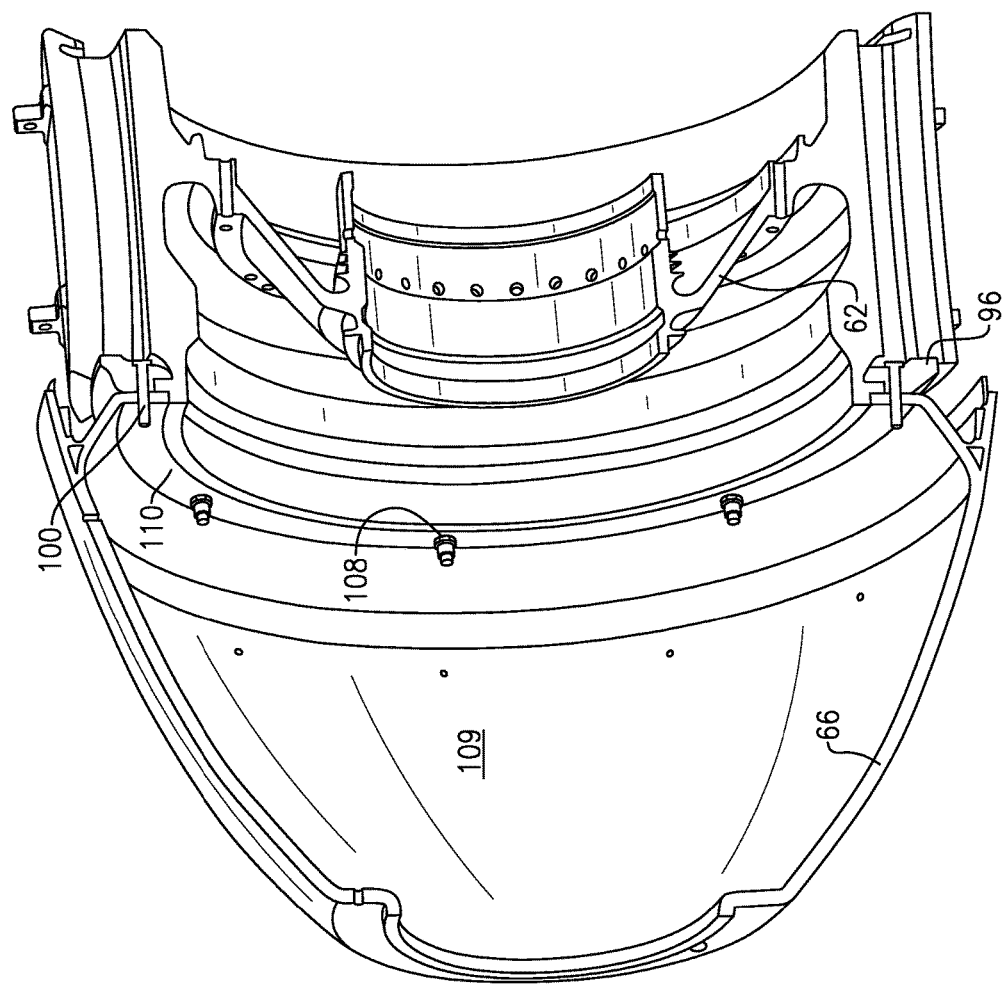
FIG. 3 is a cross-sectional perspective view through a fan hub and a spinner using a single lock ring.

As shown in FIG. 3, a single lock ring 96 is used to axially retain the fan blades to the fan hub 62. The spinner 66 is secured directly to the lock ring 96 using first and second fastening elements 100, 108. In the example shown, an integral flange 110 of the spinner 66 is secured to the lock ring 96. A separate bracket may be used if desired. Access to the second fastening element 108 is provided through a cavity 109 of the spinner 66 with the cap 70 (illustrated in FIG. 2A) removed.

Figure 4A:
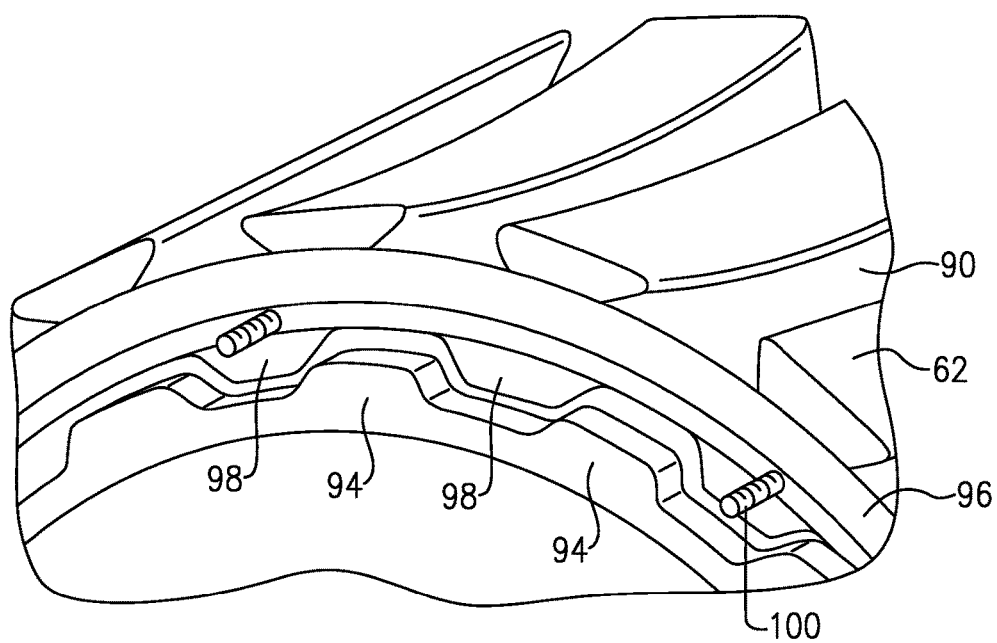
FIG. 4A is a partial perspective view of the lock ring in an unlocked position with respect to the fan hub.
Figure 4B:
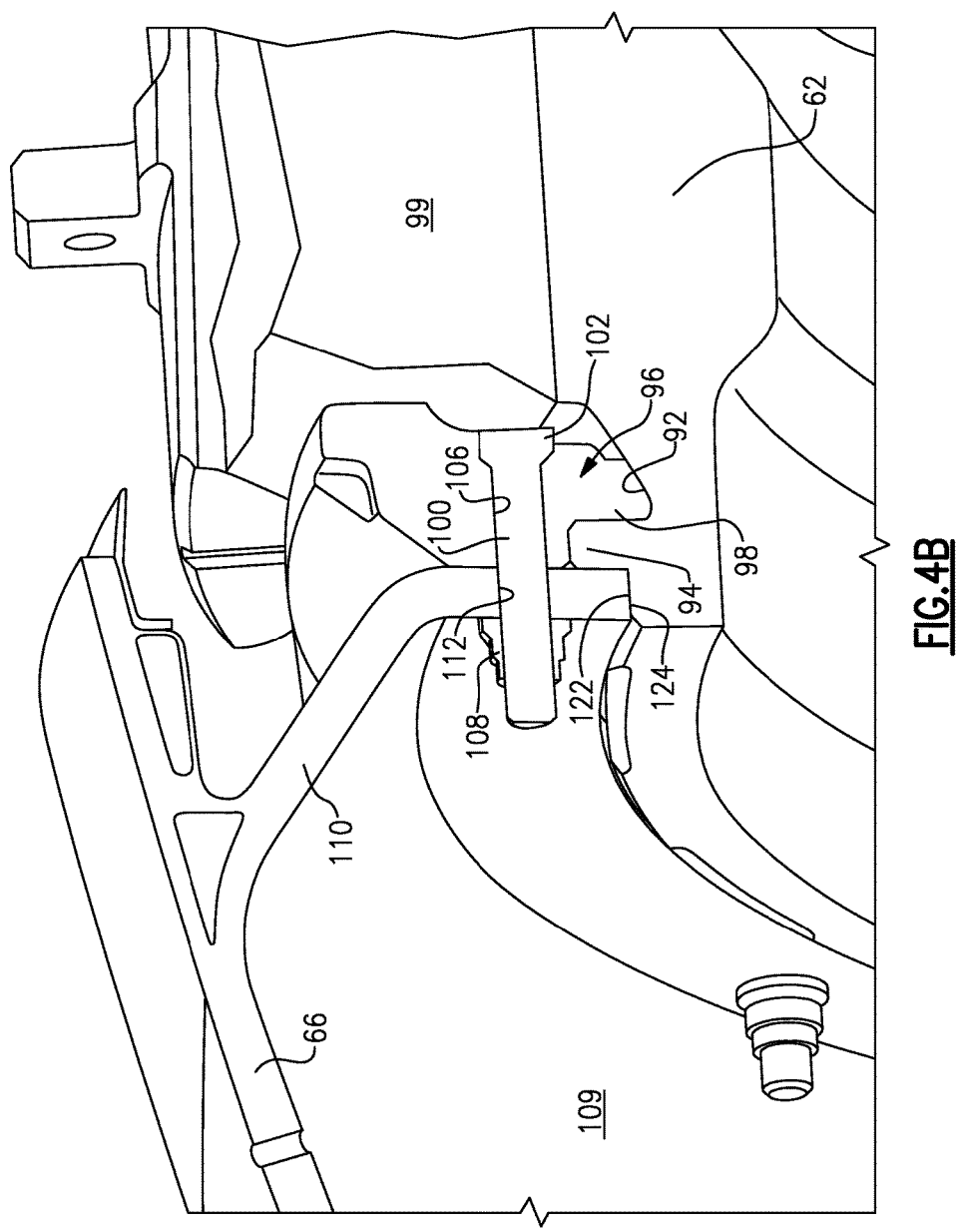
FIG. 4B is an enlarged cross-sectional perspective view of the lock ring in the locked position, as shown in FIG. 3.

Referring to FIGS. 4A and 4B, the fan hub 62 includes an annular recess 92 that receives the lock ring 96 in a locked position. An unlocked position is illustrated in FIG. 4A. Circumferentially spaced apart hub tabs 94 are provided on the fan hub 62. In the unlocked position, circumferentially spaced ring tabs 98 are received in the gaps provided between the hub tabs 94 to permit the lock ring 96 to be slid into the annular recess 92. The lock ring 96 is rotated from this unlocked position to at least partially align the hub tabs 94 and the ring tabs 98, which prevents axial movement of the lock ring 96 with respect to the fan hub 62. In this position, a back side of the lock ring 96 abuts the roots 99 of the fan blades 42, as shown in FIG. 4B.

Figure 5:
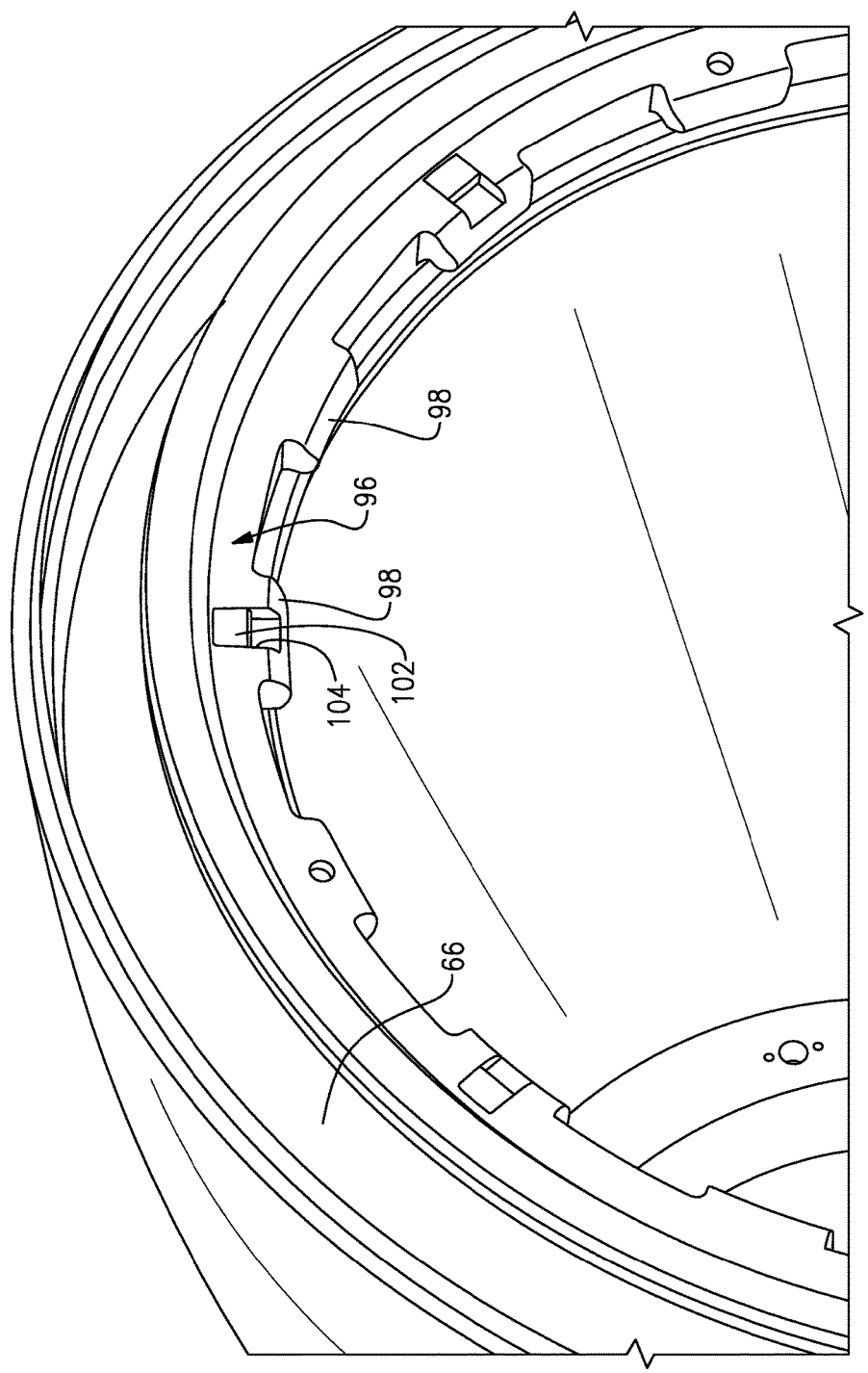
FIG. 5 is a perspective view of a back side of the lock ring with the spinner secured thereto.

With continuing reference to FIG. 4B, the first fastening element 100, which is a bolt in the example, extends through a hole 106 in the lock ring 96. As best shown in FIG. 5, a back side of the lock ring 96 includes a locating feature 104, such a notch, which cooperates with a head 102 of the first fastening element 100 to prevent rotation of the first fastening element 100 during tightening of the second fastening element 108.

Returning to FIG. 4B, the flange 110 includes an inner diameter 124, which cooperates with an annular shoulder 122 of the fan hub 62 to precisely locate the spinner 66 relative to the fan hub on the common axis A. The spinner could be radially located with respect to the lock ring 96, if desired. A corresponding aperture 112 in the flange 110 receives the first fastening element 100. The flange 110 is secured to the first fastening element 100 by tightening of the second fastening element 108, which is a nut in the example.

Figure 6:
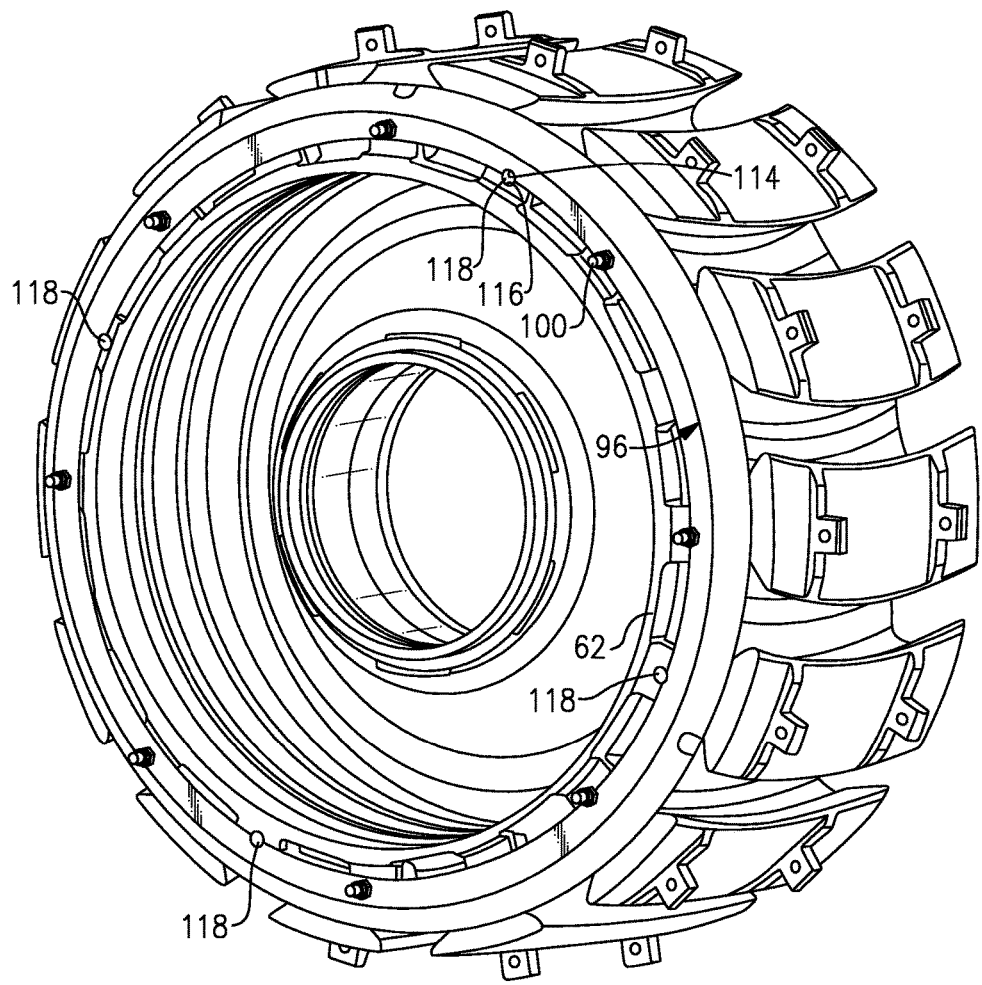
FIG. 6 is a perspective view of the lock ring in the locked position and pins used to circumferentially retain the lock ring relative to the fan hub.

Multiple circumferentially arranged locating elements, in this example, pins 118 are used to circumferentially lock the lock ring 96 with respect to the fan hub 62, as shown in FIG. 6. First and second slots 114, 116, which are arcuate in shape in one example, are respectively provided in the lock ring 96 and the fan hub 62 to receive discrete pins 118 in an interference fit relationship. In the example, the pins 118 prevent rotational movement of the lock ring 96 relative the fan hub 62. An end of each pin 120 is generally flush with respect to a front face of the lock ring 96, as best shown in FIG. 7. The flange 110 abuts the ends 120 to prevent the pins 118 from backing out of the first and second slots 114, 116.

Although an example embodiment has been disclosed, a worker of ordinary skill in this art would recognize that certain modifications would come within the scope of the claims. For that reason, the following claims should be studied to determine their true scope and content.

What is claimed is:

1. A fan section for a gas turbine engine comprising:
   a fan hub having blade slots receiving a root of a fan blade, wherein the fan hub includes circumferentially spaced first slots;
   a lock ring configured to move rotatably from an unlocked position to a locked position for securing the blade root in the blade slot, the lock ring includes circumferentially spaced second slots aligned with the first slots in the locked position;
   a nose cone secured to the lock ring, thereby secured to the fan section; and
   a plurality of discrete locating elements, each configured to be slidably received in paired first and second slots in the locked position to prevent rotational movement of the lock ring relative the fan hub, wherein the first and second slots are arcuate in shape, and each locating element includes a pin engaging the first and second slots in an interference fit.

2. The fan section according to claim 1, wherein the pin include an end retained by the spinner.

3. A method of assembling a fan section of a gas turbine engine comprising the steps of:
   mounting fan blades into a fan hub;
   sliding a lock ring onto the fan hub;
   rotating the lock ring to axially retain the fan blades within the fan hub;
   inserting discrete locating elements into aligned slots in the fan hub and lock ring to prevent relative rotational movement between the lock ring and fan hub; and
   securing a nose cone directly to the lock ring.

4. The method according to claim 3, comprising the step of inserting the first fastening elements into the lock ring prior to sliding the lock ring onto fan hub.

5. The method according to claim 3, wherein the mounting step includes sliding roots of the fan blades into the corresponding slots in the fan hub, whereby the lock ring axially blocks the axial movement of the fan blade roots.

6. The method according to claim 3, wherein the nose cone retains the locating elements axially.

7. The method according to claim 3, wherein the securing step includes fastening a spinner to the lock ring, and securing a cap to the spinner.

* * * * *